United States Patent
Kumar

(10) Patent No.: US 11,503,479 B2
(45) Date of Patent: Nov. 15, 2022

(54) BACKHAUL DYNAMIC LINK DISTANCE

(71) Applicant: Parallel Wireless, Inc., Nashua, NH (US)

(72) Inventor: Gaurav Kumar, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 63 days.

(21) Appl. No.: 16/871,700

(22) Filed: May 11, 2020

(65) Prior Publication Data

US 2020/0359235 A1    Nov. 12, 2020

Related U.S. Application Data

(60) Provisional application No. 62/846,253, filed on May 10, 2019.

(51) Int. Cl.
*H04W 24/02* (2009.01)
*H04W 74/08* (2009.01)
*H04L 1/18* (2006.01)
*H04W 84/12* (2009.01)
*H04W 84/18* (2009.01)

(52) U.S. Cl.
CPC .......... *H04W 24/02* (2013.01); *H04L 1/1812* (2013.01); *H04W 74/0808* (2013.01); *H04W 84/12* (2013.01); *H04W 84/18* (2013.01)

(58) Field of Classification Search
CPC ... H04W 28/04; H04W 72/04; H04W 72/042; H04W 88/08; H04W 24/02; H04W 74/0808; H04L 5/0007; H04L 1/1812
USPC .......................................................... 370/329
See application file for complete search history.

(56) References Cited

U.S. PATENT DOCUMENTS

| | | | | |
|---|---|---|---|---|
| 8,228,861 | B1* | 7/2012 | Nix | H04L 1/20 370/329 |
| 8,971,263 | B2* | 3/2015 | Johansson | H04W 28/24 370/329 |
| 2007/0127417 | A1* | 6/2007 | Kalika | H04W 8/005 370/338 |
| 2008/0025208 | A1* | 1/2008 | Chan | H04L 12/42 370/217 |
| 2011/0038343 | A1* | 2/2011 | Bhatti | H04W 28/06 370/330 |
| 2013/0107748 | A1* | 5/2013 | Dravida | H04W 84/18 370/252 |
| 2013/0329676 | A1* | 12/2013 | Karaoguz | H04W 16/16 370/329 |
| 2014/0003254 | A1* | 1/2014 | Andreoli-Fang | H04W 28/02 370/252 |
| 2014/0219168 | A1* | 8/2014 | Joo | H04W 40/246 370/328 |

(Continued)

*Primary Examiner* — Peter G Solinsky
*Assistant Examiner* — Sanjay K Dewan
(74) *Attorney, Agent, or Firm* — Michael Y. Saji; David W. Rouille

(57) ABSTRACT

A method for providing backhaul dynamic link distance for backhaul is disclosed. In one embodiment, the method includes propagating, by a network owner, a configured link distance parameter as part of beacon; using, by a mesh node joining the network, the configured link distance parameter for backhaul to set slot-time and Acknowledgement (ACK)/Clear To Send (CTS) timeout values before joining the network; wherein the configured link distance parameter for backhaul is part of a backhaul network profile.

12 Claims, 5 Drawing Sheets

(56) References Cited

U.S. PATENT DOCUMENTS

| | | | |
|---|---|---|---|
| 2014/0301354 A1* | 10/2014 | Davydov | H04L 5/0094 |
| | | | 370/330 |
| 2015/0282032 A1* | 10/2015 | Gupta | H04W 72/0453 |
| | | | 370/237 |
| 2015/0334717 A1* | 11/2015 | Rashid | H04W 16/02 |
| | | | 370/329 |
| 2015/0358082 A1* | 12/2015 | Ross | H04B 10/27 |
| | | | 398/115 |
| 2016/0183281 A1* | 6/2016 | Yeh | H04J 3/0614 |
| | | | 370/332 |
| 2016/0308755 A1 | 10/2016 | Garg | |
| 2018/0199218 A1* | 7/2018 | Ashrafi | H04W 24/04 |
| 2018/0302807 A1* | 10/2018 | Chen | H04L 45/22 |
| 2019/0069187 A1* | 2/2019 | Ashrafi | H04W 72/0406 |
| 2019/0268906 A1* | 8/2019 | Perdomo | H04W 72/0453 |
| 2020/0196341 A1* | 6/2020 | Mishra | H04J 11/0056 |
| 2020/0389469 A1* | 12/2020 | Litichever | H04L 63/1425 |
| 2021/0007155 A1 | 1/2021 | Garg et al. | |
| 2021/0232468 A1* | 7/2021 | Tidke | G06F 11/2023 |

* cited by examiner

BACKHAUL DYNAMIC LINK DISTANCE

CROSS-REFERENCE TO RELATED APPLICATIONS

This application claims priority under 35 U.S.C. § 119(e) to U.S. Provisional Pat. App. No. 62/846,253, filed May 10, 2019, titled "Wi-Fi Backhaul Dynamic Link Distance" which is hereby incorporated by reference in its entirety for all purposes. This application also hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. Pat. App. Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850U501); US20170272330A1 (PWS-71850US02); and Ser. No. 15/713,584 (PWS-71850U503).

BACKGROUND

A wireless mesh network is a communications network made up of radio nodes organized in a mesh topology. Wireless mesh networks often consist of mesh clients, mesh routers and gateways. In current mesh networks, a link distance is part of network profile and the default link distance is set to 3000 meters. When the actual distance between mesh nodes is higher than 3000 meters, then the mesh node may fail to connect, due to various factors relating to the weakness of the radio frequency signaling between the two distant nodes.

SUMMARY

Systems and methods for backhaul dynamic link distance for backhaul are disclosed. A network owner can propagate a configured link distance as part of a message, such as a beacon, so that mesh nodes joining the network can use this value to set a slot-time and ACK/CTS timeout values before joining the network.

In one embodiment, a method is disclosed for providing-backhaul dynamic link distance for backhaul. The method includes propagating, by a network owner, a configured link distance parameter as part of beacon; using, by a mesh node joining the network, the configured link distance parameter to set slot-time and Acknowledgement (ACK)/Clear To Send (CTS) timeout values before joining the network; wherein the configured link distance parameter is part of a backhaul network profile.

DETAILED DESCRIPTION

The following definitions are provided. Clear to Send (CTS) timeout is the time duration in micro-seconds that hardware should wait before retrying RTS/CTS procedure. Acknowledge (ACK) timeout is the time duration in micro seconds that the device should wait for ACK before retrying data frame. The SOT-time is the basic unit of timing in microseconds for 802.11 protocols. Vendor IE is the Vendor Information element. Network Owner is the node that creates the network. A beacon is any message being used to alert network nodes of the existence and configuration parameters of a particular network.

The network owner will propagate configured link distance as part of beacon using the Vendor IE so that a mesh node joining the network can use these values to set slot-time and ACK/CTS timeout values before joining the network. This is applicable to all mesh network deployments. The link distance parameter should be part of a backhaul network profile, which may be configured on a HetNet Gateway (HNG) as described herein, or otherwise using a network coordinator or network controller. The link distance parameter has a range of 300-15000 meters. The link distance parameter has default value of 3000 meters and should be a multiple of 300. The Network Owner may maintain and add the link distance parameter in beacon (or other network control message), via Vendor IE (which may be added to any message as it is proprietary) using the network configuration. The network owner may calculate CTS/ACK timeout and slot-time based on the link distance configured for the network. Then, based on the link distance parameters, the HNG, the individual mesh node, and/or the system as a whole can look up and apply the appropriate timeout and slot time parameters. The mesh node should use the link distance parameter to configure the ACK timeout, the CTS timeout and the slot-time. The mesh node that is receiving link distance parameter from the beacon can add the same value in its own beacons as well. It should be appreciated that the location of each base station could be obtained via preconfiguration or GPS.

Figure 1:
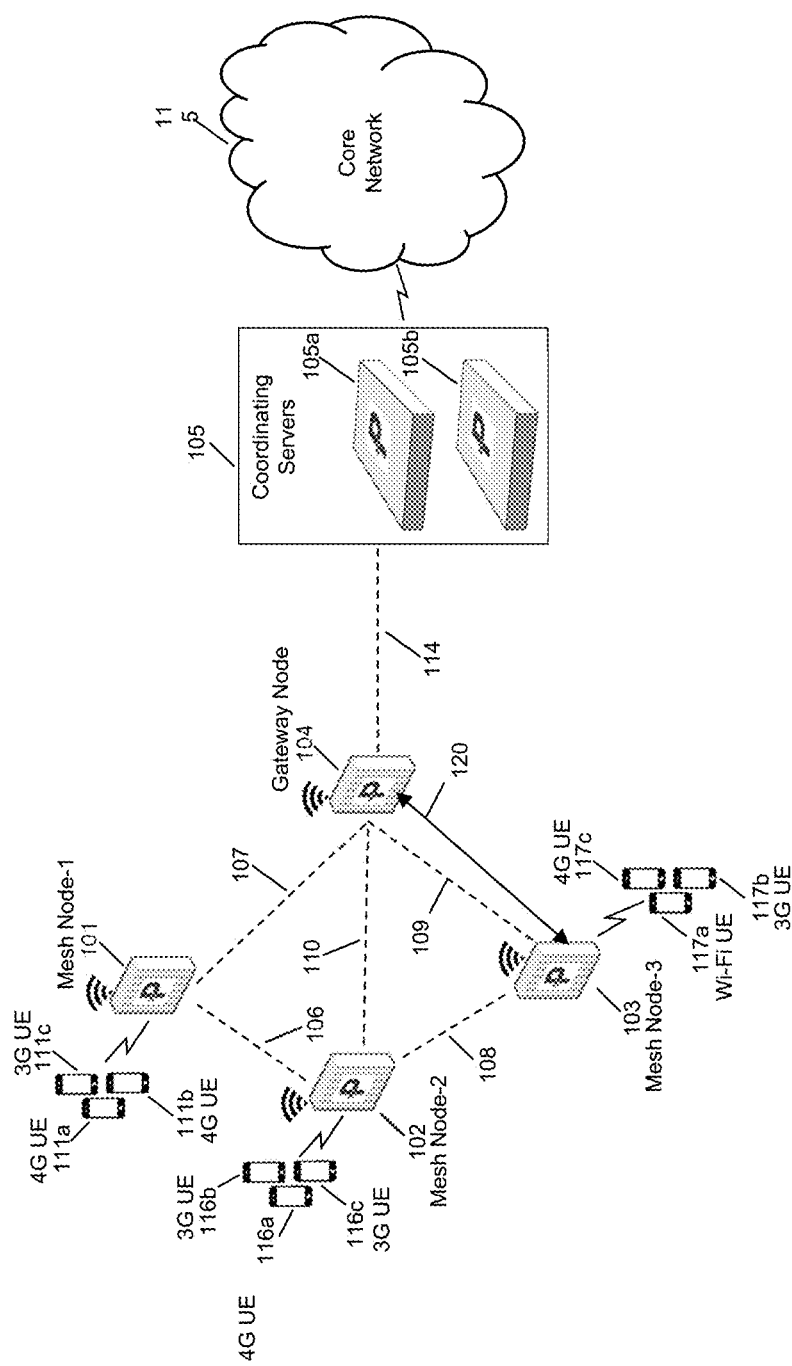
FIG. 1 is a network diagram in accordance with some embodiments.

In some embodiments, as shown in FIG. 1, a mesh node 1 101, a mesh node 2 102, and a mesh node 3 103 are multi-radio access technology (multi-RAT) base stations. Base stations 101, 102, and 103 form a mesh network establishing mesh network links 106, 107, 108, 109, and 110 with a base station 104. The mesh network links are flexible and are used by the mesh nodes to route traffic around congestion within the mesh network as needed. The base station 104 acts as gateway node or mesh gateway node, and provides backhaul connectivity to a core network to the base stations 101, 102, and 103 over backhaul link 114 to a coordinating server(s) 105 and towards core network 115. The Base stations 101, 102, 103, 104 may also provide eNodeB, NodeB, Wi-Fi Access Point, Femto Base Station etc. functionality, and may support radio access technologies such as 2G, 3G, 4G, 5G, Wi-Fi etc. The base stations 101, 102, 103 may also be known as mesh network nodes 101, 102, 103.

The coordinating servers 105 are shown as two coordinating servers 105a and 105b. The coordinating servers 105a and 105b may be in load-sharing mode or may be in active-standby mode for high availability. The coordinating servers 105 may be located between a radio access network (RAN) and the core network and may appear as core network to the base stations in a radio access network (RAN) and a single eNodeB to the core network, i.e., may provide virtualization of the base stations towards the core network as described in, e.g., U.S. Pat. No. 9,491,801, hereby incorporated by reference in its entirety. As shown in FIG. 1, various user equipments 111a, 111b, 111c are connected to the base station 101. The base station 101 provides backhaul connectivity to the user equipments 111a, 111b, and 111c connected to it over mesh network links 106, 107, 108, 109, 110 and 114. The user equipments may be mobile devices, mobile phones, personal digital assistant (PDA), tablet, laptop etc. The base station 102 provides backhaul connection to user equipments 112a, 112b, 112c and the base station 103 provides backhaul connection to user equipments 113a, 113b, and 113c. The user equipments 111a, 111b, 111c, 112a, 112b, 112c, 113a, 113b, 113c may support any radio access technology such as 2G, 3G, 4G, 5G, Wi-Fi, WiMAX, LTE, LTE-Advanced etc. supported by the mesh network base stations, and may interwork these technologies to IP.

In the example of FIG. 1, the configured link distance is set to a predetermined distance (e.g., 1500 meters). When each node is less than 1500 meters from each other, they are each able to join the mesh network. All the nodes (node 1, node 2, node 3 and gateway node) are less than 1500 meters away from each other, and thus able to join the mesh network.

In the event a node was greater than the configured link distance, the node would not be able to join the mesh network without alteration of the above parameters, e.g., ACK, CTS, time slot. For example, if the distance 120 between node 3 and the gateway node was more than 1500 meters, then node 3 would not be able to join the mesh network. Coordinating server 105 can propagate an extended distance profile, and mesh node 104 can propagate a network distance parameter via a beacon IE, that is then used by distant mesh node 101 (more than 1500 meters away) to correctly configure the node 101 so that it is able to connect.

Figure 2:
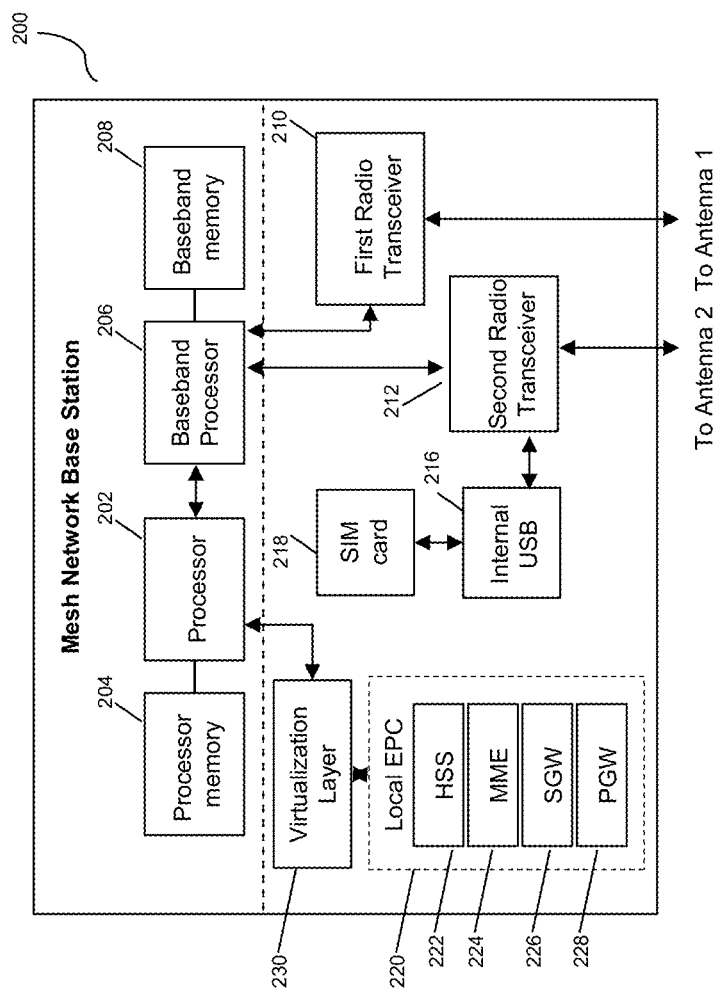
FIG. 2 is a diagram showing components a mesh network base station, in accordance with some embodiments.

Referring to FIG. 2, an example of a mesh node such as a mesh base station is shown. Mesh network base station 200 may include processor 202, processor memory 204 in communication with the processor, baseband processor 206, and baseband processor memory 208 in communication with the baseband processor. Base station 200 may also include first radio transceiver 210 and second radio transceiver 212, internal universal serial bus (USB) port 216, and subscriber information module card (SIM card) 218 coupled to USB port 214. In some embodiments, the second radio transceiver 212 itself may be coupled to USB port 216, and communications from the baseband processor may be passed through USB port 216.

A virtualization layer 230 may also be included for mediating communications with an evolved packet core EPC, specifically including the core network EPC (not shown) and local evolved packet core (EPC) module 220. Local EPC 220 may be used for authenticating users and performing other EPC-dependent functions when no backhaul link is available. Local EPC 220 may include local HSS 222, local MME 224, local SGW 226, and local PGW 228, as well as other modules. Local EPC 220 may incorporate these modules as software modules, processes, or containers. Local EPC 220 may alternatively incorporate these modules as a small number of monolithic software processes. Virtualization layer 230 and local EPC 220 may each run on processor 202 or on another processor, or may be located within another device.

Processor 202 and baseband processor 206 are in communication with one another. Processor 202 may perform routing functions, and may determine if/when a switch in network configuration is needed. Baseband processor 206 may generate and receive radio signals for both radio transceivers 210 and 212, based on instructions from processor 202. In some embodiments, processors 202 and 206 may be on the same physical logic board. In other embodiments, they may be on separate logic boards.

The first radio transceiver 210 may be a radio transceiver capable of providing LTE eNodeB functionality, and may be capable of higher power and multi-channel OFDMA. The second radio transceiver 212 may be a radio transceiver capable of providing 3GPP WCDMA functionality. Both transceivers 210 and 212 are capable of receiving and transmitting on one or more bands. In some embodiments, transceiver 210 may be capable of providing both LTE eNodeB and LTE UE functionality, and transceiver 212 may be capable of UMTS BTS functionality, UMTS UE functionality, or both. The transceivers may be switched. Transceiver 210 may be coupled to processor 202 via a Peripheral Component Interconnect-Express (PCI-E) bus, and/or via a daughtercard. As transceiver 212 is for providing LTE UE functionality, in effect emulating a user equipment, it may be connected via the same or different PCI-E bus, or by a USB bus, and may also be coupled to SIM card 218.

SIM card 218 may provide information required for authenticating the simulated UE to the evolved packet core (EPC). When no access to an operator EPC is available, local EPC 220 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 200 is not an ordinary UE but instead is a special UE for providing backhaul to device 200.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 210 and 212, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 202 for reconfiguration. While the description provided refers to Wi-Fi backhaul, it should be understood that this is for explanation purposes only, and that mesh backhaul, mesh connection with or without backhaul, and using a wireless link for backhaul other than Wi-Fi could also be used.

Other elements and/or modules may also be included, such as a home eNodeB, a local gateway (LGW), a self-organizing network (SON) module, or another module. Additional radio amplifiers, radio transceivers and/or wired network connections may also be included.

Processor 202 may identify the appropriate network configuration, and may perform routing of packets from one network interface to another accordingly. Processor 202 may use memory 204, in particular to store a routing table to be used for routing packets. Baseband processor 206 may perform operations to generate the radio frequency signals for transmission or retransmission by both transceivers 210 and 212. Baseband processor 206 may also perform operations to decode signals received by transceivers 210 and 212. Baseband processor 206 may use memory 208 to perform these tasks.

Figure 3:
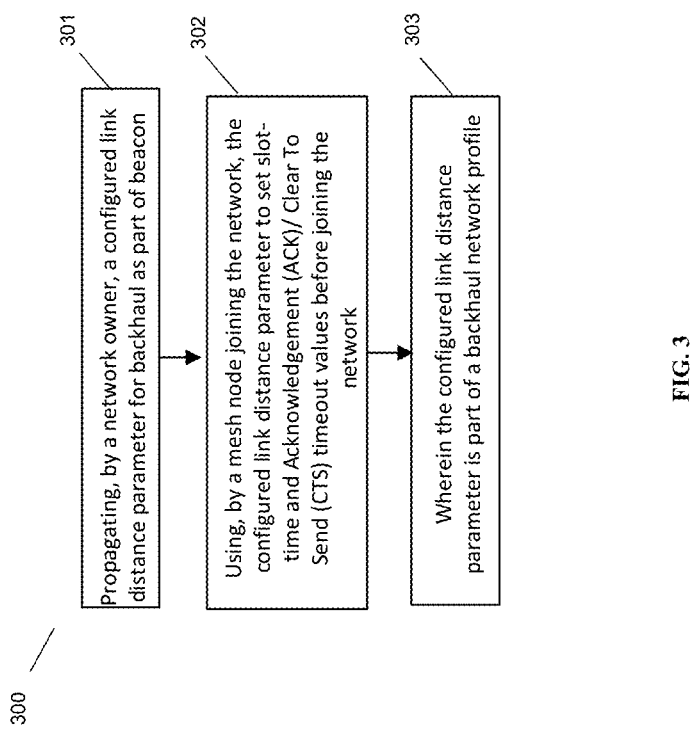
FIG. 3 is a flow diagram showing a method for implementing Wi-Fi backhaul dynamic link distance, in accordance with some embodiments.

FIG. 3 shows a flowchart of one embodiment of a method 300 for implementing backhaul dynamic link distance for backhaul, in accordance with some embodiments. As shown at processing block 301, the method includes propagating, by a network owner, a configured link distance parameter as part of beacon. The configured link distance parameter is configured on a HetNet Gateway (HNG), or using a network coordinator or a network controller. The configured link distance parameter has a range of 300-15000 meters, and has default value of 3000 meters and is a multiple of 300.

Processing block 302 shows the step of using, by a mesh node joining the network, the configured link distance parameter to set slot-time and Acknowledgement (ACK)/Clear To Send (CTS) timeout values before joining the network. This step may further include calculating, by the network owner, a CTS/ACK timeout and slot-time based on the configured link distance parameter configured for the network, and may further include looking up and applying the appropriate timeout and slot time parameters. This step may additionally include using, by a mesh node, the configured link distance parameter to configure the ACK timeout, the CTS timeout and the slot-time.

Processing block 303 recites wherein the configured link distance parameter is part of a backhaul network profile. The method may further include maintaining and adding, by the network owner, the configured link distance parameter in a network control message via a vendor information element (IE) using the network configuration. The method of claim 1 further comprising adding, by the mesh node that is receiving the configured link distance parameter from the beacon can add the same value in its own beacons.

Figure 4:
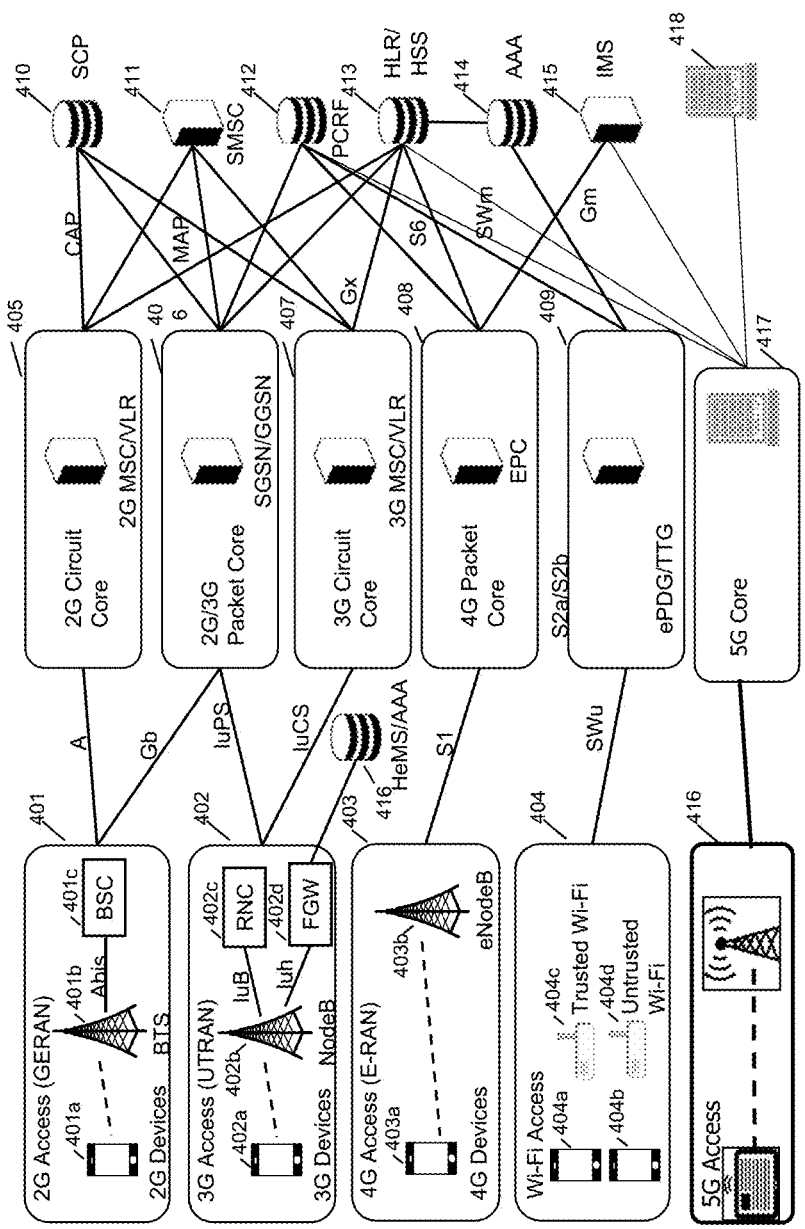
FIG. 4 is a schematic network architecture diagram for 3G and other-G networks, in accordance with some embodiments.

FIG. 4 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 4G core 417 is shown using a single interface to 4G access 416, although in some cases 4G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 5:
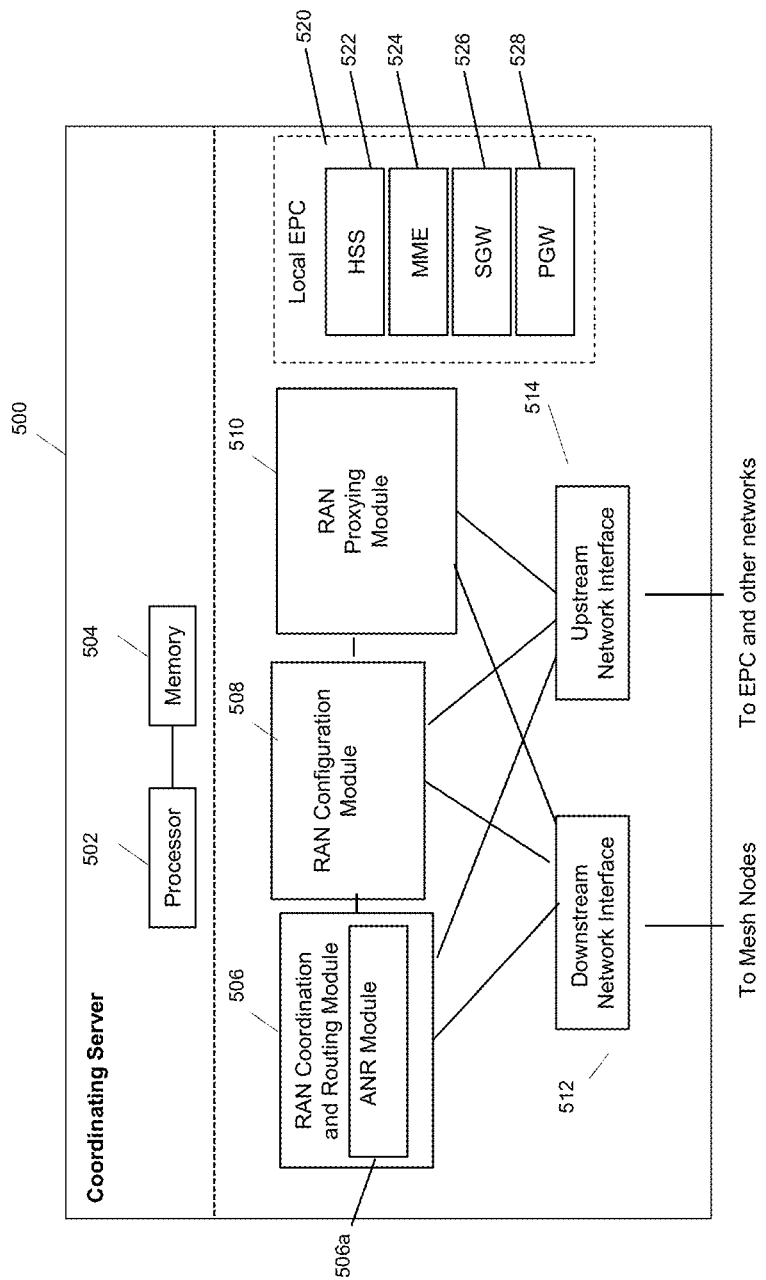
FIG. 5 is a coordinating server for providing services and performing methods as described herein, in accordance with some embodiments.

FIG. 5 is a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available.

Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing backhaul dynamic link distance, comprising: propagating, by a network node that creates the network, a dynamically configured link distance parameter from a backhaul network profile for backhaul as part of beacon, wherein propagating the configured link distance parameter for backhaul comprises propagating a configured link distance parameter for backhaul only having a range of 300-15000 meters in 300 meter increments;
  using, by a mesh node joining the network, the configured link distance parameter for backhaul to set slot-time and Acknowledgement (ACK)/Clear To Send (CTS) timeout values before joining the network; and
  wherein the configured link distance parameter for backhaul is part of a backhaul network profile.

2. The method of claim 1 wherein propagating the configured link distance parameter for backhaul comprises propagating a configured link distance parameter for backhaul having default value of 3000 meters and is a multiple of 300.

3. The method of claim 1 further comprising maintaining and adding the configured link distance parameter for backhaul in a network control message via a vendor information element (IE) using the network configuration.

4. The method of claim 1 further comprising calculating a CTS/ACK timeout and slot-time based on the configured link distance parameter for backhaul configured for the network.

5. The method of claim 4 further comprising looking up and applying the appropriate timeout and slot time parameters.

6. The method of claim 1 further comprising using, by a mesh node, the configured link distance parameter for backhaul to configure the ACK timeout, the CTS timeout and the slot-time.

7. The method of claim 1 further comprising adding, by the mesh node that is receiving the configured link distance parameter for backhaul from the beacon can add the same value in its own beacons.

8. The method of claim 1 wherein the location of each base station is obtained via preconfiguration or via a Global Positioning System (GPS).

9. The method of claim 1 wherein the backhaul dynamic link distance for backhaul is used for a wired backhaul for a wireless backhaul.

10. The method of claim 9 wherein the wired backhaul is one or more of an Ethernet-based backhaul, Gigabit Ethernet, a fiber-optic backhaul connection, or a cable-based backhaul connection, in some embodiments.

11. The method of claim 9 wherein the wireless backhaul is one or more of Wi-Fi 802.11a/b/g/n/ac/ad/ah, Bluetooth, ZigBee, microwave.

12. The method of claim 9 wherein any of the wired and wireless connections may be used for either access or backhaul.

* * * * *